W. A. CORDER.
HOSE RACK.
APPLICATION FILED FEB. 15, 1917.

1,258,093.

Patented Mar. 5, 1918.

Witnesses:

Inventor:
William A. Corder.
By Frederick Whyper
Attorneys

UNITED STATES PATENT OFFICE.

WILLIAM A. CORDER, OF LOS ANGELES, CALIFORNIA.

HOSE-RACK.

1,258,093.

Specification of Letters Patent.

Patented Mar. 5, 1918.

Application filed February 15, 1917. Serial No. 148,752.

*To all whom it may concern:*

Be it known that I, WILLIAM A. CORDER, a citizen of the United States, residing at Los Angeles, in the county of Los Angeles and State of California, have invented a new and useful Hose-Rack, of which the following is a specification.

This invention pertains to devices adapted to hold a hose in convenient position for easily and quickly disengaging the hose from the holder, as is desirable, for instance, in case of fire.

An object of the invention is to produce a hose rack from which the hose can be disengaged with maximum ease and quickness.

Another object is to support the hose in such manner that the coils or folds will be freely released one at a time when the hose is pulled for that purpose.

Other objects and advantages will appear in the subjoined detail description.

The accompanying drawings illustrate the invention:

Figure 1:
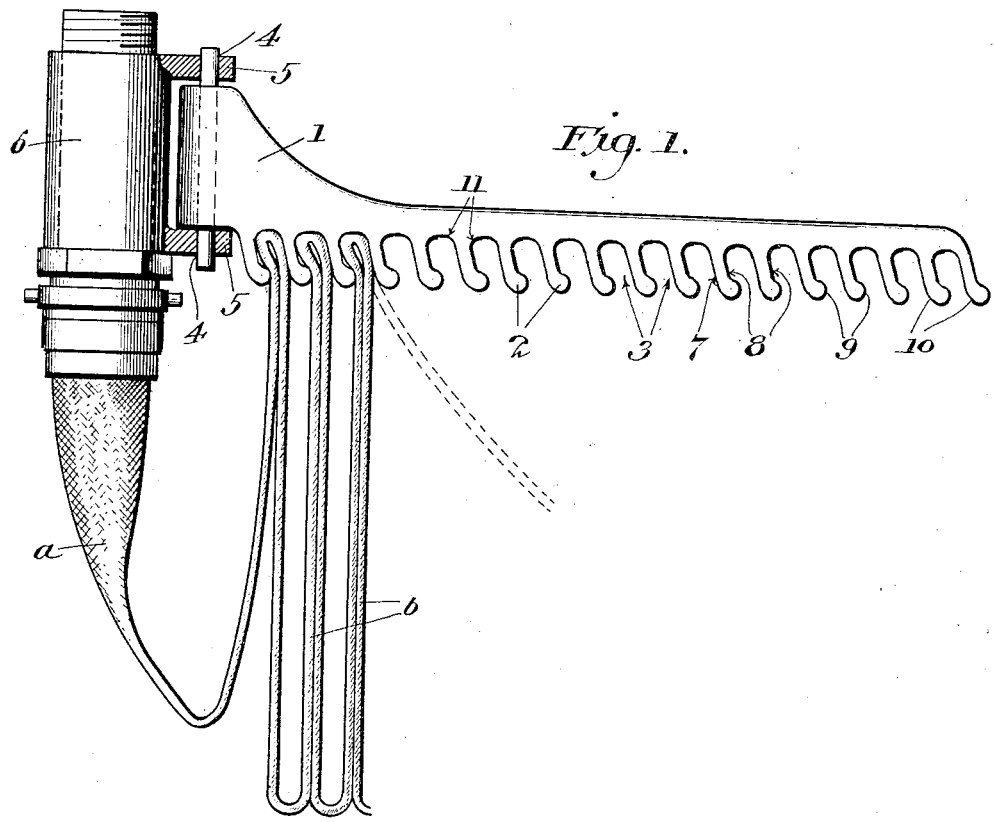
Figure 1 is a side elevation of a hose rack constructed in accordance with the provisions of this invention, there also being shown the coils or folds of a hose hung in the rack.
Figure 2:
Fig. 2 is a plan view of Fig. 1 with portions of the bracket broken away to contract the view and the hose being omitted.
Figure 3:
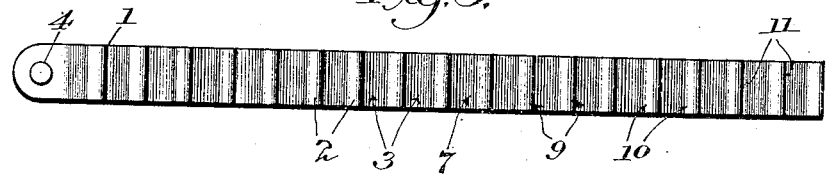
Fig. 3 is an inverted plan view of the rack arm.

There is provided an arm 1 of suitable length, said length depending upon the length of the hose and length of the coils or folds to be supported by the rack. The arm 1 is provided with downwardly projecting teeth 2 which form the side walls of slots, notches or recesses 3 therebetween. The teeth 2 are thicker at their lower ends than at their upper ends and consequently the slots 3 are wider at their upper ends than at their lower ends. The arm 1 is adapted to hang substantially horizontal and may be supported in that position by any suitable means, in the instance shown in the drawings said arm being pivoted at 4 to the ears 5 of a bracket 6 which may be hollow and may constitute a portion of a water supply pipe line as is well understood in the art dealing with hose racks.

The teeth 2 are set aslant from the vertical, the slant being away from the supported end of the arm 1. The rear faces 7 of the teeth 2 are flat and the front faces of said teeth may have flat portions 8 substantially parallel to the rear faces 7 and said front faces are provided with convex portions forming forwardly extending toes 9 which are rounded at 10 to join the rear faces 7 of the teeth to form the tips of the teeth. It is thus seen that the space between the tips of the adjacent teeth is less than the space between the portions of said teeth above said tips. The roots of the teeth may be provided with fillets 11 so that the upper ends of the slots 3 will be curved as shown.

In practice the arm 1 will be hung in substantially horizontal position, as shown, and a hose indicated at *a*, Fig. 1, will be inserted in the notches 3 by crimping or folding said hose to form coils or folds, as clearly shown at *b* in Fig. 1, and forcing said coils or folds into the inter-tooth spaces. The folds of the hose will practically fill the notches 3 and the portions of the folds outside of the slots will hang substantially vertical thus causing the hose to bend around the convex portions or toes 9 of the teeth. The toes 9 thus extending partially beneath portions of the hose will retain the hose in the slots against the force of gravity, the natural tendency of the hose to spread at the coils producing sufficient friction against the tooth faces to aid in the retention of the hose.

When it is desired to disconnect the hose from the rack in a hurry, as for instance in case of fire, the person desiring to use the hose will take hold of its discharge end and will pull said hose away from the supported end of the arm 1 and in the direction of slant of the teeth 2 thus readily drawing the folds *b* one after another out of the slots so that the hose will be in condition for directing the water wherever desired.

I claim:

1. A hose rack comprising a notched arm, said notches extending aslant downward toward one end of the arm and being wider at their upper ends than at their lower ends so as to retain the folds of a hose hung therein.

2. A hose rack comprising a series of teeth set aslant to the vertical, said teeth having convex portions on their front faces to support the folds of a hose.

3. A hose rack comprising an arm having transversely extending notches in its under side, said notches being narrower at their lower ends than at their upper ends.

4. A hose rack comprising an arm having teeth projecting aslant downward toward one end of said arm, the rear faces of said teeth being straight and the front faces of said teeth having straight portions and having forwardly extending curved tips which join the rear faces in a curve.

5. A hose rack comprising an arm having teeth projecting downwardly aslant toward one end of said arm, each tooth having a forwardly projecting toe to extend beneath a portion of a hose having a fold inserted between adjacent teeth.

6. A hose rack comprising an arm having integral therewith spaced members adapted to embrace and frictionally engage the folds of a hose, the spaces between the members being less adjacent the outer ends of the members than adjacent the inner portions of said members.

7. A hose rack comprising an arm having integral therewith spaced members adapted to embrace the folds of a hose, said members having flat face portions to frictionally engage said folds.

Signed at Los Angeles, California, this 5th day of February, 1917.

WILLIAM A. CORDER.

Witnesses:
GEORGE H. HILES,
A. F. SCHMIDTBAUER.

Copies of this patent may be obtained for five cents each, by addressing the "Commissioner of Patents, Washington, D. C."